INVENTOR.
Fred W. Quelle Jr.

3,556,657
LASER RANGEFINDER
Fred W. Quelle, Jr., 120 Nichols Road,
Cohasset, Mass. 02025
Filed Jan. 26, 1968, Ser. No. 700,992
Int. Cl. G01c 3/08
U.S. Cl. 356—4                                       4 Claims

ABSTRACT OF THE DISCLOSURE

The combination of an erbium Q-spoiled laser and a germanium avalanche diode detector, both operating in the 1.5 micron region, provides a laser rangefinder or target designation system having excellent transmission characteristics through adverse atmospheric conditions while presenting no hazard to the human eye. The germanium avalanche diode and the multiply doped, erbium glass laser combination, in addition to eliminating the eye hazard problem, also provides as much as an order of magnitude improvement in efficiency over ruby-laser, photomultiplier-detector systems.

---

The invention described herein may be manufactured and used by or for the Government of the United States of America for governmental purposes without the payment of any royalties thereon or therefor.

This invention relates to laser range-finding and target designation systems and, more particularly, to the combination of an erbium laser with a germanium avalanche diode detector which operates at a wave length which is not hazardous to the eye and, in addition, achieves an order of magnitude superior performance over the ruby-laser range finder with a conventional photomultiplier detector.

One of the major obstacles to widespread use of laser range-finding has been danger to the human eye, and especially to the retina, caused by the intense radiation from the laser. This eye hazard represents a severe liability in the use of laser rangefinders at airports, on aircraft carriers and in tactical military field operations for such purposes as tank fire control, artillery rangefinding, laser-illuminated target designation and aircraft control.

A further problem has involved finding a laser whose radiation would propagate without substantial attenuation in all weather conditions. There has been to date a large effort to develop suitable equipment to utilize existing transmission "windows" in the visible and near visible regions. Since photomultipliers cannot operated beyond these regions, no attempt has been made to utilize more favorable transmission characteristics of the near infrared. A third problem, therefore, has been the need for a low noise detector in the near infrared to be able to extract the returning signal from noise.

The present invention solves the above three problems by utilizing a laser lasing in a region of the near infrared where retinal eye damage is not experienced and a detector capable of operating efficiently in this range. More specifically, this invention contemplates the use of an erbium laser lasing in the 1.54 micron range in combination with a germanium avalanche diode detector and attendant control circuitry. At this wave length the damage to the retina from a several megawatt, Q-spoiled laser is negligible even at close range. The use of the germanium avalanche detector, which has a sensitivity of 1.54 microns comparable to photomultipliers operating in the visible part of the spectrum decreases the power necessary for efficient, all-weather operation because of the better atmospheric transmission through fog and haze at 1.54 microns. This power reduction also contributes to eye protection.

The recent development of a low noise, germanium avalanche diode detector operating out to the 1.54 micron range provides as much as an order of magnitude improvement in the over-all performance of detectors operating in this region due to their noise free, internal multiplication.

In addition, a multiply doped, erbium glass laser radiating at 1.536 microns operates as an efficient, Q-spoiled laser whose radiation falls in the infrared spectrum where there is relatively less atmospheric absorption and scatter than in the visible or near visible region, giving the system an increased all-weather capability. A one-inch by two-millimeter rod gives about 200 millijoules for a 150 joule flashlamp input. A glass host material is utilized as a base material for the rod because it produces broader line widths than a crystalline host, thus promoting better energy transfer between the multiple dopants of the rod. The erbium laser is also superior to the ruby laser due to independence of its operational characteristic on ambient temperature.

It is therefore the object of this invention to provide an improved laser rangefinder or target designation system by combining a Q-spoiled erbium laser with a germanium, avalanche diode detector.

It is a further object of the present invention to provide for a system utilizing laser radiation which will not be injurious to the human eye.

Other objects, advantages and novel features of the invention will become apparent from the following detailed description of the invention when considered in conjunction with the accompanying drawings wherein.

Figure 1:
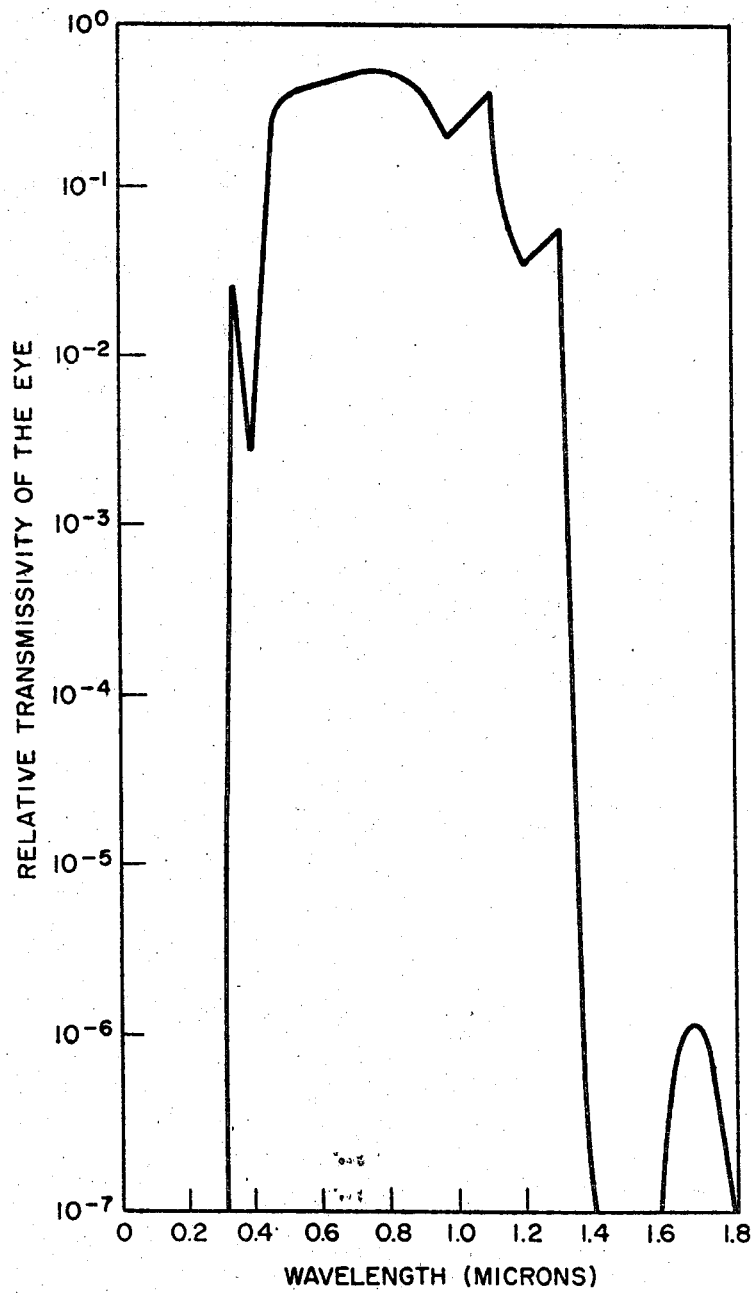
FIG. 1 is a graph showing eye damage as a function of relative eye transmissivity and radiation wave length, indicating minimal transmission of radiation to the retina in the 1.54 micron region.

Referring to FIG. 1, which is a graph indicating relative transmissivity of the human eye to a spectrum of radiation, it will be seen that as the relative transmissivity decreases, the threshold for damage to the retina of the eye increases. The threshold increases because the light is attenuated in the ocular medium as it passes to the retina. As a result of the increased attenuation in the 1.54 micron region, eye damage due to intense radiation is minimized. It has been found that because of this ocular attenuation in the 1.54 micron range, a damage threshold of .07 j./cm.$^2$ focused on the retina, as established by the office of the Surgeon General of the United States, is not reached even at close range. This finding permits the use of such radiation in applications where intense monochromatic light might otherwise cause extensive damage. Laser range-finding is one such application which potentially exposes the human eye to such damage as to render systems utilizing conventional lasers impractical. The erbium laser, hereinafter described, lases in this 1.54 micron region and, in combination with a germanium avalanche diode detector, provides a practical, hazard-free range-finding system.

Figure 1A:
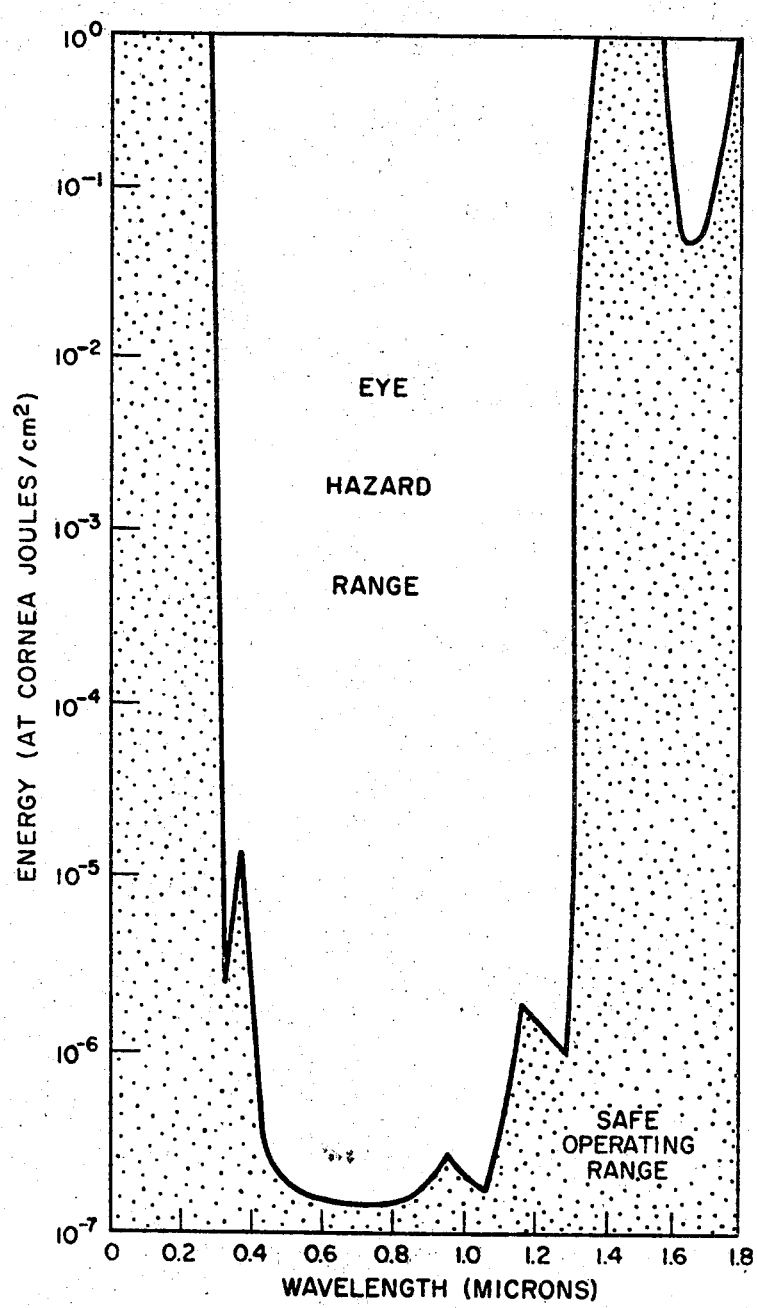
FIG. 1A shows an eye hazard threshold curve which indicates that at 1.54 microns the energy necessary to damage the retina of the eye is above 1 joule/cm.$^2$.

FIG. 1A shows the eye hazard radiation threshold as a function of wave length. The shaded portion indicates energy levels at which no retinal eye damage will occur. Retinal eye damage is the most severe eye damage because once damage to the retina occurs it will not heal naturally. Retinal damage due to irradiation occurs more frequently than other damage due to irradiation because the light is focused to a small, intense point on the retina. While other damage, such as damage to the cornea, can occur at about .5 j./cm.$^2$, retinal damage may begin to occur at an intensity of $10^{-7}$ j./cm.$^2$ at the cornea or, correspondingly, 0.7 j./cm.$^2$ on the retina. From FIG. 1A it can be seen that in the region between 1.4 and 1.6 microns no retinal eye damage occurs at radiation levels below 1 joule/cm.$^2$. Since the lasers contemplated to operate in this range operate in the 100 millijoule range, no damage is experienced by the human eye even by direct irradiation at close range. This is contrasted to the ruby laser which, at 100 millijoules would cause considerable damage upon direct irradiation of the human eye. It can further be seen that in utilizing the 1.4 to 1.6 micron range higher power lasers may be used to increase the range of the system without causing eye damage. It will be appreciated from FIG. 1A that the region beyond 1.8 microns will likewise offer little hazard to the human eye.

Figure 2:
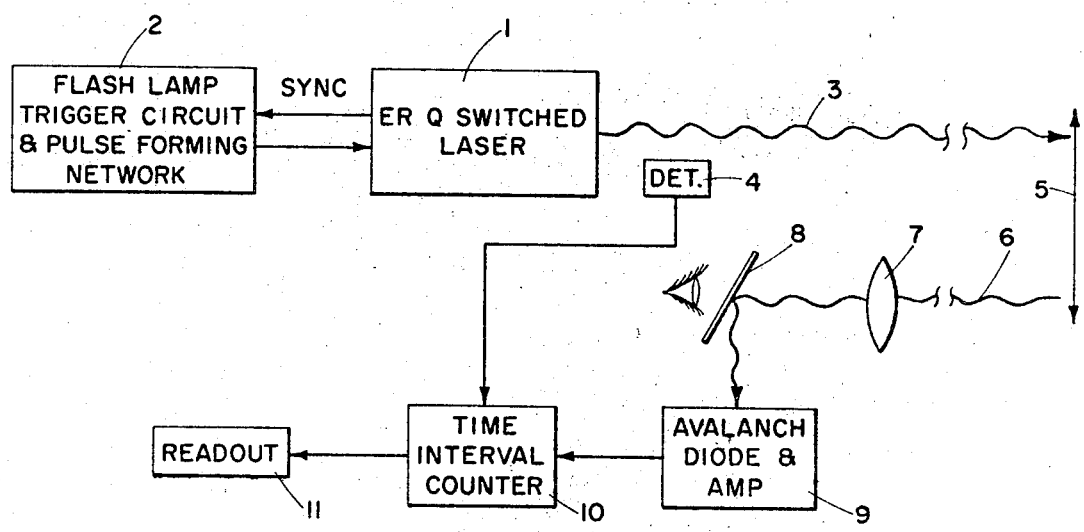
FIG. 2 shows a schematic diagram of the laser range-finding system utilizing a laser operating in the 1.54 micron region.

In FIG. 2 an erbium Q-switched laser 1 is shown pumped by a flashlamp and trigger circuit 2. The flashlamp is triggered by a high voltage trigger circuit 2 synchronized with a Q-switching mechanism such as that shown at 36 in FIG. 4. After a population inversion has been achieved by the above pumping, the erbium rod is made to lase in the pulsed mode by the above Q-switching mechanism. The laser emits a beam of monochromatic 1.536 micron radiation having a beam width of 1 to 2 milliradians past a conventional detector 4 which detects the emitted pulse of light. The transmitted light then propagates through the atmosphere until it impinges on a target 5. A portion of the reflected light, shown by line 6, is focused by suitable optics 7 and reflected by a mirror 8. Mirror 8 is coated so as to reflect only 1.54 micron light, allowing sighting of the laser through the mirror. It will be appreciated that the entire laser system may be completely self-contained and mounted so as to facilitate ease in aiming.

The reflected light is then detected by germanium avalanche diode detector and amplified by amplifier 9. The output of detector 4 and the amplified output of detector 9 are fed to a time interval counter 10, where the time interval between the transmitted and received pulse is computed. This time difference is then converted into a distance by a conventional readout circuit 11. It will be appreciated that the rangefinder can take a more sophisticated form, including complicated optics, pattern recognition circuitry, multiple target differentiation and different modulation techniques. It will also be appreciated that it is possible to use other detectors having a suitable response in the 1.54 micron range or other combinations of lasers and detectors operating substantially in the 1.4 to 1.5 micron region.

While previous detectors, such as reversed biased P-I-N photodiodes and photoconductors, have been used to detect light in the infrared, noise has been the major problem with these photodetection devices. Detection devices utilizing photo-emission characteristics are not suitable for use in detecting radiation having a wave length greater than about one micron, because photons having such long wave lengths do not possess sufficient energy to liberate electrons from the surface of presently available photoemissive materials with reasonable quantum efficiencies.

Figure 3:
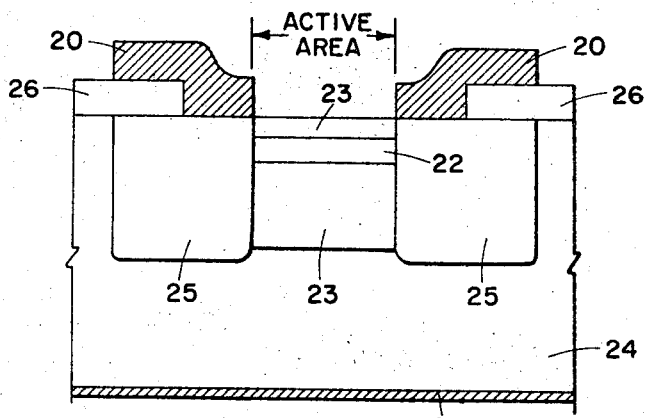
FIG. 3 shows a schematic diagram of the avalanche diode detector utilized in the system shown in FIG. 1.

FIG. 3 shows diagrammatically a low noise avalanche diode detector which avoids this problem. The present germanium avalanche diode detector for use with the erbium laser was found to have an adequate response in the 1.54 micron region. This type of detector, having contacts 20 and 21, is characterized by (1) a uniform avalanche region 22; (2) high field absorption regions 23; (3) a zero field absorption region 24; and (4) a guard ring 25 to eliminate surface breakdown. In an N+-P diode, the guard ring is a higher breakdown N-P junction while the guard ring in the NP$\pi$P structure is achieved by surrounding the active area with a higher breakdown N$\pi$P junction.

Generally speaking, light which strikes the semiconductor is absorbed in the high-field absorption region 23 shown on either side of avalanche region 22. Carriers generated in this region by incoming light move to the avalanche region 22 at high drift velocities and have high cut-off frequencies due to the high drift velocity caused by the field. The avalanche multiplication occurs in the avalanche region 22 at the P-N junction where the carriers are accelerated by a high reverse biased potential field through the avalanche region to such an extent that collisions with valence electrons remove these electrons from their covalently bonded location. The colliding particle, in producing a second electron and a hole, has produced two secondary particles which are again accelerated by the reverse biasing potential field. If the total applied voltage is increased, the secondary particles will be accelerated fast enough to generate new carriers by collision and thus create a self-sustained multiplication process. The onset of this self-sustaining multiplication provides the theoretical upper limit to the reverse biasing voltage.

The zero-field absorption region 24, which may be illuminated to a limited extent by the incoming light, represents the undepleted bulk material where carriers are generated. These carriers diffuse to the high-field depletion region 23 or the guard ring 25. The effective size of this region is determined by the diffusion length of generated carriers and the manner in which light enters the device. If the diffusion length is long, light which enters the zero field region can generate carriers which have very long diffusion transit times. This action is undesirable because the slowly diffusing carriers do not contribute to the high frequency A.C. quantum efficiency and detract from the signal-to-nose ratio by generating shot noise currents. The generation of carriers outside the high-field diffusion region can be limited by providing for a mask 26 at the top surfaces and edges of the detector. The effect of carriers generated outside the high-field diffusion region can also be suppressed by providing another junction (not shown) to sweep these carriers away. It will be appreciated that the avalanche detector may take a variety of physical forms having the four physical characteristics mentioned above.

Figure 4:
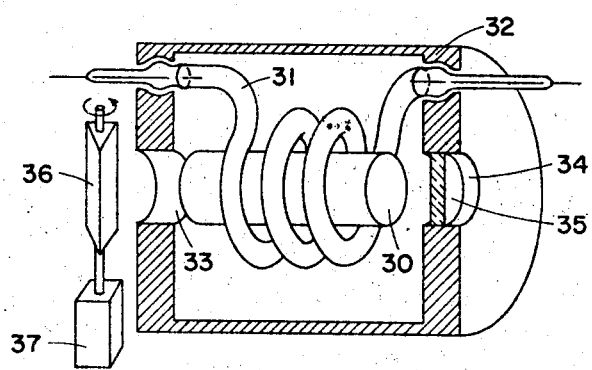
FIG. 4 shows a diagram of a Q-spoiled erbium laser and flashlamp arrangement used to provide the monochromatic radiation for the rangefinder shown in FIG. 1.

FIG. 4 shows diagrammatically an erbium Q-spoiled laser having as an active element erbium rod 30. This rod is excited by a flashlamp 31 mounted in a housing 32. The housing has a rear orifice 33 and a forward orifice 34 in which is mounted a half-silvered mirror 35. To provide for the Q-spoiling, a rotatable prism 36 is mounted adjacent orifice 33 and is powered by motor 37 so as to produce a pulsed output in the 1.54 micron region when flashlamp 31 is synchronized with the motor. In order to achieve a five kilometer range for an all-weather range finder utilizing a germanium avalanche diode detector, the output of the laser must be, at minimum, on the order of 50 millijoules with a beamwidth of 1 to 2 milliradians. It will be appreciated that any means of pumping and Q-spoiling may be employed in order to achieve a pulsed output. Longitudinal flashlamp configurations along with rotating prism, Pockels cell and Kerr cell type Q-spoilers may successfully be used.

Assuming no atmospheric attenuation and a 30% diffuse reflectivity from a target subtending the entire beam at a range of 5 kilometers, approximately 2 parts in $10^{12\text{th}}$ of the original beam is returned to a 10 cm.$^2$ collecting aperture. Atmospheric attenuation will further reduce the returned signal. This attenuation is due to both scattering and absorption. An empirical formula for the attenuation, $\tau_s$, due to scattering is given by $$(1) \quad \tau_s = \exp-\left[\left(\frac{3.91}{V}\right)\left(\frac{.55}{\lambda}\right).585V^{1/3}R\right]$$

where R is the range in kilometers, V is the visual range in kilometers at 5500 A. and $\lambda$ the wave length in microns. For wave lengths such as 6943 A., 1.06$\mu$ and 1.54$\mu$ at which suitable sources are available, the atmospheric absorption is practically negligible and almost all atmospheric attenuation comes from scattering. The signal power P returned to a detector aperture of area A may therefore be calculated, neglecting absorption, using the equation $$(2) \quad P = \frac{P_o \sigma A}{2\pi R^2} \exp-\left[\frac{3.91}{V}\left(\frac{.55}{\lambda}\right).585V^{1/3}2R\right]$$

where $\sigma$ is the diffuse target reflectivity, Po the power output of the laser, and A is the area of the detecor. Obviously, the weakest signal is returned to the detector when the visibility is equal to the range. Under such adverse conditions, more than an order of magnitude less power is necessary at 1.5 microns than at 7000 A.

The erbium rod 30 is multiply doped as follows: The laser rod is formed with Barium Crown glass as a base, although it will be appreciated that other glass compounds may be used. The constituents of the Barium Crown glass are mixed with oxides of neodymium, ytterbium and erbium impurities during the melting process. Typical weight percentages of the three rare-earth impurities are as follows:

| | Weight percent |
|---|---|
| $Yb_2O_3$ | 15 |
| $Nd_2O_3$ | 3 |
| $Er_2O_3$ | 5 |

It will be understood that although the foregoing values have produced acceptable results, other weight percentages are possible.

When the rod is pumped by flashlamp 31, the neodymium acts as a major absorber of the flashlamp irradiation. The ytterbium also absorbs a significant amount of flashlamp irradiation in the 1 micron region of the spectrum. The energy absorbed in the neodymium is transferred to the ytterbium in a cross-relaxation process. The ytterbium subsequently transfers its energy to the erbium which lases. Too high a concentration of neodymium tends to quench the erbium lasing level and is thus undesirable. The large amounts of ytterbium are necessary to provide a broad line width so as to allow better energy transfer from the neodymium to the ytterbium and to provide better optical absorption in the .8 to 1.0 micron region. At the same time, the relatively small amount of neodymium is dictated by the quenching of the lasing transition of the erbium. Since erbium functions as a three-level laser, a low erbium concentration is desirable so as to result in reasonably low thresholds for laser action and because at least 50% of the erbium ions must be raised up to the excited state before laser action can begin.

Figure 5:
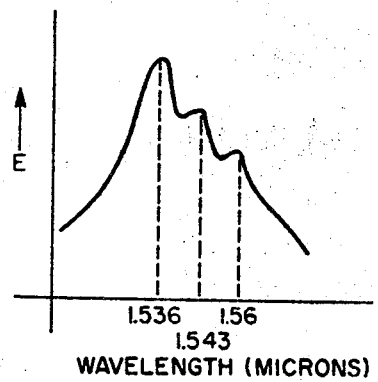
FIG. 5 shows the spectral emission lines of the erbium laser in the 1.54 micron region.
Figure 6:
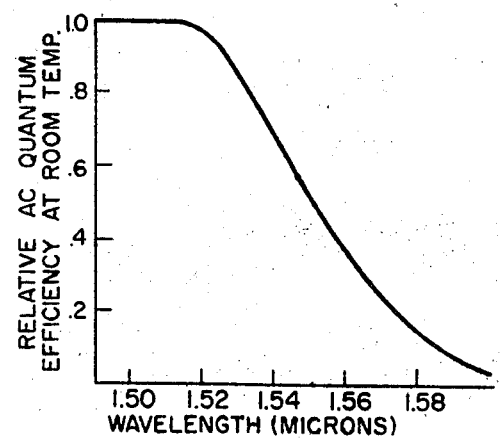
FIG. 6 shows a spectral response curve of the avalanche diode detector.

The spontaneous emission output for an erbium laser is shown in FIG. 5. Emission peaks occur at 1.536 microns, 1.543 microns and 1.56 microns. At room temperature, the highest peak is at 1.536 microns. As the temperature of the rod is raised, the other two peaks tend to rise and compete with 1.536 micron peak. Since the absorption length in the germanium detector increases rapidly with wave length in the 1.54 micron region, the quantum efficiency is markedly inferior at 1.543 and 1.56 microns to that at 1.536 microns. Thus, it is desirable to have the spontaneous emission peak at 1.536 microns substantially greater than the other peaks so as to insure detection by the germanium avalanche detector. The response curve of the germanium avalanche diode shown in FIG. 6 shows the sharp drop in efficiency for wave lengths longer than 1.52 microns. At 1.536 microns, the efficiency of the detector has dropped to 70%. At 1.543 microns, it is 50% and at 1.56 microns it is under 40%. The germanium avalanche diode detector can, however, provide a large improvement over detectors now capable of operating in the 1.54 micron range.

Obviously many modifications and variations of the present invention are possible in the light of the above teachings. It is therefore to be understood that within the scope of the appended claims the invention may be practiced otherwise than as specifically described.

What is claimed is:

1. Apparatus for determining the distance between a reference location and a remote reflecting target, utilizing radiation which will not be injurious to the human eye, comprising:
   means for radiating pulsed monochromatic energy having a wavelength of 1.4 to 1.6 microns from said reference location toward said target, said wavelength being unattenuated by the earth's atmosphere so that said radiated energy can reach remote targets under all weather conditions and being heavily attenuated by the ocular fluid in the human eye so that eye damage caused by accidental exposure to said radiated energy is prevented by said attenuation;
   means at said reference location for detecting said pulsed energy after it has been reflected by said remote target; and
   means for indicating the round trip travel time of said detected pulsed energy, said time being directly proportional to the distance between said reference location and said remote target.

2. The apparatus as recited in claim 1 wherein said means for radiating monochromatic energy is an erbium laser.

3. The apparatus as recited in claim 2 wherein said means for detecting includes a germanium avalanche diode sensor in combination with said erbium laser.

4. A method for preventing eye damage caused by a laser which produces a monochromatic light beam of an intensity that normally destroys portions of the human retina whenever said beam directly impinges on the lens of the human eye, comprising:
   operating said laser at a wavelength which falls within a narrow 1.4 to 1.6 micron range,
      said range being a region of the electromagnetic spectrum where radiation is substantially attenuated by the ocular fluid in the human eye such that any energy delivered to the lens of said eye by said laser beam is attenuated in heating said ocular fluid before it can be focused on a small portion of said retina, whereby said laser may safely be operated in populated areas.

5. Apparatus for transmitting a light beam over substantial distances within the earth's atmosphere from one location to a second location;

means at said first location for radiating a monochromatic light beam,
    said means including a laser operated at a wavelength of 1.4 to 1.6 microns, said wavelength both permitting the transmission of said beam without substantial attenuation by the earth's atmosphere and being substantially attenuated by the ocular fluid in the human eye, whereby said laser may be safely operated in populated areas over substantial distances in all weather conditions; and
means at said second location for detecting said light beam.

References Cited

UNITED STATES PATENTS

| | | | |
|---|---|---|---|
| 2,075,696 | 3/1937 | Boerstler | 350—3X |
| 3,002,093 | 9/1961 | Kis et al. | 356—4X |
| 3,402,630 | 9/1968 | Blau et al. | 356—5UX |

RICHARD A. FARLEY, Primary Examiner

J. G. BAXTER, Assistant Examiner

U.S. Cl. X.R.

331—94.5; 350—1, 3